2,991,292
PROCESS FOR THE PRODUCTION OF DYESTUFF INTERMEDIATES

Eberhard Degener and Siegfried Petersen, Leverkusen, Germany, assignors to Farbenfabriken Bayer Aktiengesellschaft, Leverkusen, Germany, a corporation of Germany
No Drawing. Filed Mar. 18, 1958, Ser. No. 722,160
Claims priority, application Germany Mar. 18, 1957
6 Claims. (Cl. 260—327)

This invention relates to novel dithiacyclohexenes-(1) and to a process for their production.

It is an object of the present invention to provide novel dithiacyclohexenes more particularly 1,2-dicyano-3,6-dithiacyclohexenes-(1). A further object is to provide a simple process for the production of these cyclohexenes. More objects will appear hereinafter.

These objects are attained in accordance with the present invention by reacting the salts of 1,2-dicyano-1,2-dimercapto-ethylene with organic compounds which contain 2 exchangeable groups in $\alpha$-position.

The cyclohexenes obtained by the process of the present invention can be substituted in the 4- and/or 5-position for example by cyano- or aryl groups or by alkyl groups which can contain hetero atoms such as 0. Furthermore these cyclohexenes can contain a second double bond between the C-atoms in 4- and 5-position.

Salts of the 1,2-dicyano-1,2-dimercapto ethylene are for example the alkali metal salts, the alkaline earth metal salts or the zinc or lead salts.

Compounds having two exchangeable groups in $\alpha$-position are, for example, 1,2 - dichloroethane, 1,2 - dibromethane, 1,2-dibromo-1 - phenylethane, ethane-1,2 - dimethane-sulphonate, propane - 1,2 - di-p-toluene-sulphonate or 1,2-dibromo-cyclohexane.

The reaction may be carried out in the presence of inert solvents such as ethanol, acetone, dimethyl formamide, water methyl glycol acetate, dioxan, pyridine or xylene. It is advantageous to operate in a dilute solution. The reaction is, moreover, preferably carried out at the lowest possible temperatures.

The optimum temperature range depends in each case on the reactivity of the exchangeable groups. In general, satisfactory results are attained by operating at temperatures within the range of between 0 and 160° C., preferably 20–80° C., but other temperatures may also be chosen.

The compounds which are obtained by the present invention have a good stability and can be used as intermediate products, for example, for the production of dyestuffs.

Example 1

200 grams of the disodium salt of 1,2-dicyano-1,2-dimercaptoethylene are dissolved in 800 millilitres of methanol and nitrogen is passed over. 200 grams of 1,2-dibromethane in 100 millilitres of methanol are added dropwise with stirring and the temperature is kept at 20–25° C. by external cooling with water. Stirring is continued at 25° C. for half hour, the temperature is then slowly raised and the reaction finally completed by boiling under reflux for one hour. Upon cooling with ice, a mixture of sodium bromide and 1,2-dicyano-3,6-dithiacyclohexene-(1) is filtered off by suction which is freed from sodium bromide by washing with water. By concentration of the alcoholic reaction solution, further quantities of dinitrile may be precipitated. A total of about 160 grams of the dicyan-dithia-cyclohexene are thus obtained. The crude product is purified by recrystallisation from 70 percent alcohol, 50 percent acetone or acetic acid using A-carbon (activated carbon).

1,2-dicyano-3,6-dithiacyclohexene - (1) crystallises in colourless crystals (M.P. 138–139° C.).

10 parts by weight of 1,2-dicyano-3,6-dithiacyclohexene-(1) are stirred in 50 parts by weight of ethylene glycol at 70° C. for one hour while passing over NH$_3$, the temperature is then slowly decreased to 20° C. and the resultant brownish yellow solution is further saturated with ammonia. The temperature is finally reduced to 0° C. to complete the crystallisation of the formed base. By suction-filtration and washing with acetone, 6.5 parts by weight of 1-amino-3-imino-4,7-dithia-4,5,6,7 - tetrahydroisoindolenine are obtained.

4 parts by weight of 1-amino-3-imino-4,7-dithia-4,5,6,7-tetrahydroisoindolenine or the tautomeric 1,3-diimino-4,7-dithia-4,5,6,7-tetrahydroisoindolenine and 1 part by weight of copper acetate are dissolved in 100 parts by weight of ethylene glycol. A cotton fabric is impregnated with this solution, the excess solution removed by squeezing and the fabric heated in a drying oven to 120–140° C. for 10 minutes. After boiling out with soap solution, there remains on the cotton a strong, dull violet dyeing fast to light.

Example 2

18.6 parts by weight of the disodium salt of the 1,2-dicyano-1,2-dimercapto ethylene, 9.9 parts by weight of 1,2-dichloroethane and 100 parts by volume of absolute alcohol are heated in a closed vessel for 6 hours to 100° C. The precipitate obtained is filtered off and extracted with chloroform. The chloroform extract is introduced into the fourfold amount of water and this mixture then extracted several times with chloroform. The chloroform extracts are washed with water treated with active carbon and dried with sodium sulfate. Upon evaporating the solvent 13 parts by weight of 1,2-dicyano-3,6-dithia-cyclohexene-(1) is obtained which is purified as described in Example 1.

Example 3

18.6 grams of the disodium salt of 1,2-dicyano-1,2-dimercaptoethylene are suspended in 100 millilitres of absolute alcohol and 20 grams of 1,2-dibromopropane in 50 millilitres of alcohol are added dropwise with cooling and passing through nitrogen. After boiling under reflux for 3 hours, the solution is cooled and poured into four times its volume of water. 11 grams of 4-methyl-1,2-dicyano-3,6-dithiacyclohexene-(1) are filtered off by suction. Upon crystallisation from 70 percent alcohol and decolouring with activated carbon colourless crystals are obtained of M.P. 87–88° C.

Example 4

26.4 grams of 1,2-dibromo-1-phenylethane are added to a suspension of 21 grams of the disodium salt of 1,2-dicyano-1,2-dimercaptoethylene in 150 millilitres of absolute alcohol. The mixture is first stirred at 40° C. for 30 minutes while passing through nitrogen and then heated under reflux for 90 minutes. After cooling, the precipitate formed is filtered off by suction and extracted with chloroform. By evaporation of the chloroform and concentration of the alcoholic reaction solutions, a total of 10.2 grams of 4-phenyl-1,2-dicyano-3,6-dithia-cyclohexene-(1) are obtained. M.P. 129–130° C.

Example 5

To a solution of 20 parts by weight of the disodium salt of 1,2-dicyano-1,2-dimercapto ethylene in 130 parts by volume of absolute ethanol there are added dropwise 23 parts by weight of 2,3-dibrom-1-methoxypropan dissolved in 40 parts by volume of ethanol at 30° C., while stirring and passing through nitrogen. Thereafter the mixture is stirred for 30 minutes at 40° C. and then heated under reflux for 90 minutes. Upon cooling the sodium bromide formed is filtered off, the solution is concentrated and then poured into water. The oil obtained is taken up in ether. The ether solution is then washed with water and dried with sodium sulfate. Upon evaporating the solvent 10 parts by weight of 4-methoxymethyl-1,2-dicyano-3,6-dithia-cyclohexene-(1) are obtained as an oil from which yellow crystals are obtained upon cooling.

*Example 6*

95 grams of the disodium salt of 1,2-dicyano-1,2-dimercaptoethylene and 5 grams of the sodium salt of di-n-butylnapthalene-sulphonic acid are dissolved in 500 millilitres of water. 40 millilitres of ethylene chloride are then added dropwise at 50–60° C. and the mixture is vigorously stirred at this temperature for two hours. Upon cooling to 20° C., suction-filtration of the solid portions, washing with water and drying, the resultant 1,2-dicyano-3,6-dithiacyclohexene-(1) is isolated. Yield: 22 grams (M.P. 132–133° C.).

*Example 7*

297 parts by weight of the disodium salt of 1,2-dicyano-1,2-dimercapto ethylene are dissolved in a mixture of 300 parts of water and 300 parts by weight of methanol. Thereafter 120 parts by volume of ethylenebromide are added at 10° C. The mixture is stirred for 5 hours at 25° C. Thereafter the precipitate is filtered off, washed with a 50 percent methanol and dried. Thus 130 parts by weight of 1,2-dicyano-3,6-dithia-cyclohexene-(1) are obtained.

*Example 8*

150 parts by weight of $$NaS-CS-CN + 3(CH_3)_2 NCHO$$

(obtained by the process described by Bähr and Schleitzer in "Chemische Berichte," vol. 88, page 1771) are dissolved in 200 parts of water. After 20 hours, the precipitated sulfur is filtered off. To the filtrate there are added 22 parts by volume of ethylenebromide and 100 parts by volume of methanol. This mixture is stirred for 7 hours at 20–25° C. Thereafter the precipitate is filtered off, washed with a 50 percent methanol and dried. Thus 31 parts by weight of 1,2-dicyano-3,6-dithiacyclohexene-(1) are obtained.

Instead of the methanol, there can be used also another solvent which is miscible with water, such as dimethylformamide or dioxane. If the process is carried out in the absence of oxygen, a very pure nearly white product is obtained. If the process is carried out in the presence of oxygen similar pure products can be obtained, if the process is carried out in the presence of an antioxydant such as potassium boranate.

*Example 9*

Into a solution consisting of 186 parts by weight of the disodium salt of 1,2-dicyano-1,2-dimercapto ethylene, 10 parts by weight of the sodium salt of dibutylnaphthaline sulfonic acid and 1 part by weight of potassium-borhydride dissolved in 1500 parts of water and 750 parts by volume of dimethylformamide, there are added dropwise within 15 minutes 150 parts by weight of 2,3-dichloropropionitrile at 25–50° C. Upon about further 30 minutes the reaction product begins to crystallize. Upon cooling off the precipitate is filtered off, washed with water and dried. Thus 135 parts by weight of the nearly colourless 12,4-tricyano-3,6-dithia-cyclohexene-(1) are obtained. The product can be recrystallized from chlorobenzene. The pure, colourless product dissolves with yellow colour in concentrated sulfuric acid or diluted aqueous ammonia.

We claim:

1. 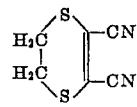

2. 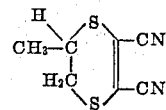

3. 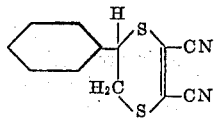

4. 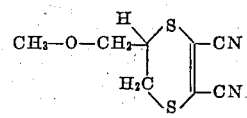

5. A compound of the formula

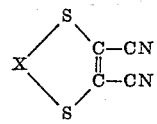

wherein X is a radical selected from the group consisting of

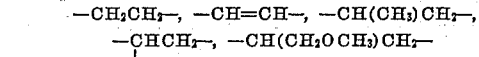

and —CH(CN)CH$_2$—.

6. A process for the production of a compound of the formula

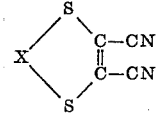

wherein X is a radical selected from the group consisting of

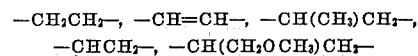

and —CH(CN)CH$_2$—, which comprises contacting at a temperature from 0° to 160° C. a salt of 1,2-dicyano-1,2-dimercapto ethylene, said salt being selected from the group consisting of alkali metal salts, alkaline earth metal salts, zinc salt and lead salt, with a reactant corresponding to the following structural formula

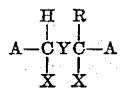

wherein each X is a member selected from the group consisting of chloro and bromo; R is a member selected from the group consisting of hydrogen, methyl, $CH_3OCH_2-$, phenyl and nitrile; and each A is hydrogen when Y is a single bond connecting the two carbon atoms of the structural formula and are nil when Y is a double bond connecting the two carbon atoms of the structural formula.

References Cited in the file of this patent

Richter's Organic Chemistry, Elsevier, N.Y., vol. IV, pages 4-5 (1947).

G. Bahr et al.: Chemische Berichte (1957), vol. 90, page 438-443.

G. Bahr et al.: Chemical Abstracts, 1957, vol. 51, Col. 9587e, an abstract of G. Bahr et al., Chem. Tech. (Berlin) 1956, vol. 8, pages 597-8.